Jan. 21, 1964

L. A. HANSEN 3,118,550

VEHICLE DUMPING APPARATUS

Filed Oct. 10, 1960

INVENTOR
LYLE A. HANSEN

BY
Lowell & Henderson

ATTORNEYS

Jan. 21, 1964     L. A. HANSEN     3,118,550
VEHICLE DUMPING APPARATUS
Filed Oct. 10, 1960     3 Sheets-Sheet 2

INVENTOR
LYLE A. HANSEN
BY
ATTORNEYS

INVENTOR
LYLE A. HANSEN
BY Lowell & Henderson
ATTORNEYS

United States Patent Office

3,118,550
Patented Jan. 21, 1964

3,118,550
VEHICLE DUMPING APPARATUS
Lyle A. Hansen, Des Moines, Iowa, assignor to Straight Engineering Company, Adel, Iowa, a corporation of Iowa
Filed Oct. 10, 1960, Ser. No. 61,631
5 Claims. (Cl. 214—49)

This invention relates generally to vehicle dumping apparatus and in particular to an apparatus wherein a vehicle is supported on a normally horizontal but upwardly swingable platform for the unloading of the vehicle contents from the rear end of the vehicle into a pit or elevator conveying mechanism.

In the hauling of grain and like material it is now common to employ tractor and trailer combination of a relatively large size having an over-all length in the neighborhood of about sixty feet. Apparatus for unloading trucks of this large size generally include a vehicle platform of a size to support the complete tractor-trailer combination and arranged for upward swinging movement to an inclined position sufficient to provide for the discharge of material from the rear end of the trailer. Where pit mounted type piston and cylinder assemblies have been used to swing the platform, appreciable trouble has been encountered due to a binding action of the piston with the cylinder effected by transverse tilting or torsional stresses imposed on the platform by the load of the vehicle. As a result the efficiency of the apparatus was impaired and the piston and cylinder assembly subjected to excessive wear.

Where ground supported cylinder and piston assemblies are employed for swinging the platform to a vehicle dumping position, such assemblies are generally of telescopic type, with one of such assemblies being arranged to each side of the lift platform. As the pistons are telescopically extended the complementary bearing surfaces of adjacent telescoped sections are reduced along with a tendency of the extended piston to whip. Piston wear is thus excessive along with a lack of stability of the lift platform in its raised or partially raised position.

An object of this invention is to provide an improved vehicle dumping apparatus.

A further object of this invention is to provide a vehicle dumping apparatus, wherein a vehicle platform is arranged for upward swinging movement, in which the piston of a pit mounted piston and cylinder assembly carries a movably mounted roller assembly operatively associated with tracks on the platform so that any lateral tipping movement of the platform is not transmitted to the piston.

A further object of this invention is to provide a vehicle dump apparatus having an upward swinging vehicle platform wherein a single pit mounted cylinder assembly is connected with the platform by a movable connection that permits limited movement of the platform relative to the assembly such that the piston of the assembly is not subjected to any bending or lateral forces tending to obstruct free piston movement.

Still another object of this invention is to provide a vehicle dump apparatus of a compact and rigid construction, wherein a single pit mounted cylinder assembly is efficient in operation to raise and lower a vehicle platform over a long service life with a minimum of wear and wherein the assembly is readily accessible through the platform for maintenance attention.

Further objects, features and advantages of this invention will become apparent from the following description when taken in connection with the accompanying drawing, wherein.

Figure 1:
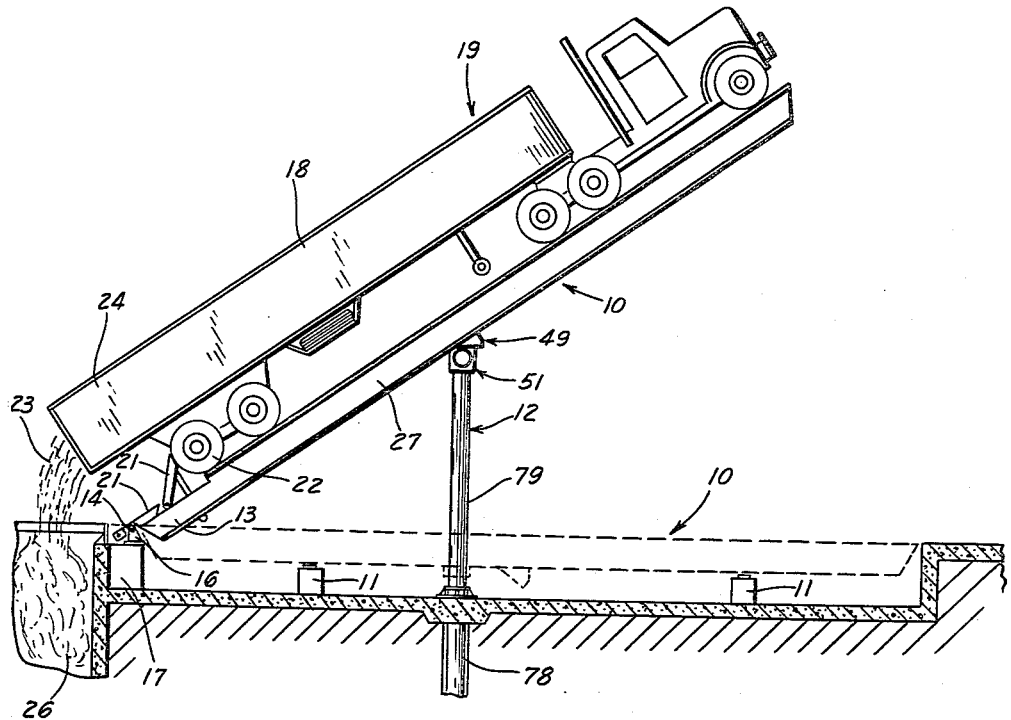
FIG. 1 is a side elevation of the truck dumping apparatus of this invention, showing a truck in a dumping position, and with parts being shown in section for the purpose of clarity.

With reference to the drawing the truck dump apparatus of this invention is illustrated in FIG. 1 as including a swingable lift platform 10, normally supported in a horizontal position on bearing foundations or supports 11, and movable upwardly to an inclined position by a piston and cylinder assembly indicated generally at 12. Swinging movement of the platform takes place relative to its end 13, which is pivotally connected, as indicated at 14, to a support 16 suitably secured or anchored to a foundation member 17. As shown in FIG. 1 the platform 10 is in a raised or dumping position for the trailer 18 of a tractor-trailer combination, indicated generally as 19, with suitable wheel stops 21 being movable into engagement with the rearmost wheels 22 of the trailer 18, to hold the combination 19 in a supported position against downward movement. A pair of wheel stops 21 are illustrated, with the use of one or the other of the stops 21 being dependent upon the length of the tractor-trailer combination 19 being handled. The contents 23 of the trailer 18 are dumped from its rear end 24 into a ground or floor pit 26 from where it is removed to storage bins or the like (not shown) by a suitable conveyor means (not shown).

The platform 10 includes a pair of side frame or beam members 27 (FIGS. 1 and 2) and comprises generally end sections 28 and 29 and a central section 31. The end section 29, at the free or swinging end 32 of the platform 10, has a brace structure, indicated generally at 33, and comprised of interconnected transverse beams 34 and 36 and longitudinal beams 37, with the beams 34 and 36 being connected to the side beams 27. Similarly, the end section 28 at the pivoted end 13 of the platform 10, has a brace structure 38 formed of interconnected transverse beams 39 and 41 being connected to the side beam members 27.

The central section 31, defined by the transverse beams 34 and 39, includes a pair of spaced transverse box section beam members 43 and 44 connected to the side beams 27, and a pair of spaced longitudinal beams 46 connected to the transverse beams 34 and 39. Between each box section beam 43, and an adjacent transverse beam 34 and 39, respectively, there is provided a transverse tubular beam member 48 which is connected to the longitudinal beams 46. The tubular beams 48 function to give torsional stability to the platform 10 as a whole. This torsional stability is complemented by the box section beams 43 and 44. In other words, should the tractor-trailer combination 19 be positioned on the platform 10 with a greater part thereof carried to one side of the platform, commonly referred to as an eccentric loading, the platform would tend to twist about its longitudinal axis. By virtue of the beams 43, 44 and 48, this eccentric load is transmitted to the remaining platform beam structures, with the transfer of the load being from one beam to another as torsional shear through the tubes 48 and box section members 43 and 44.

Figure 2:
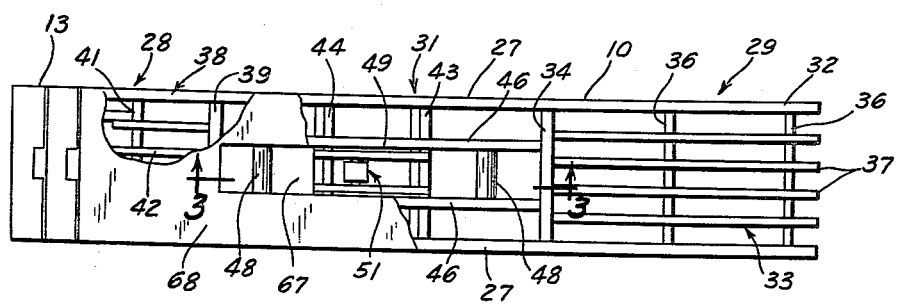
FIG. 2 is a plan view of the dumping apparatus with parts broken away to more clearly show its construction.
Figure 3:
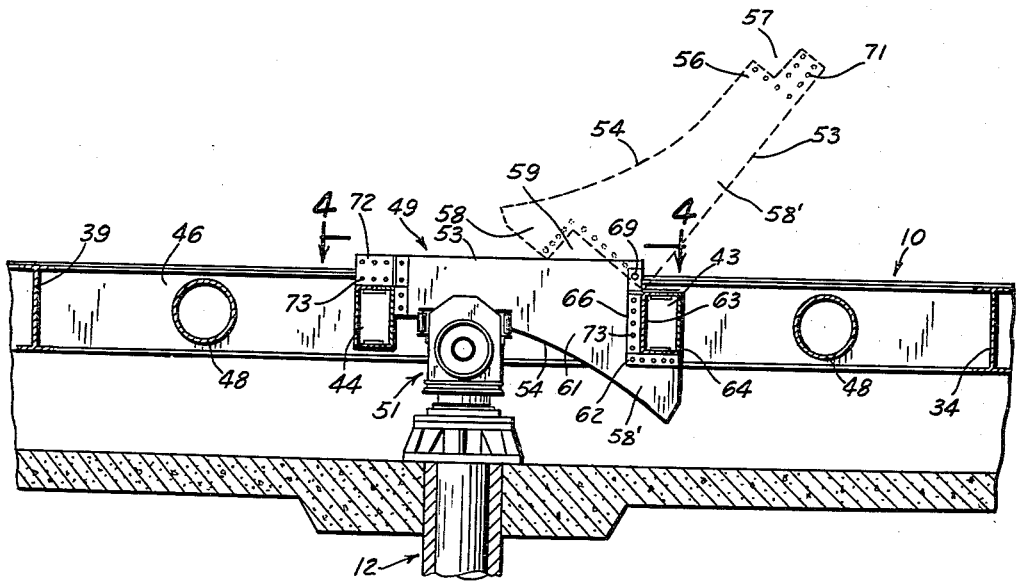
FIG. 3 is an enlarged sectional detail view taken along the line 3—3 in FIG. 2.

Extended between and secured to the box section beams 43 and 44, and at a position between the longitudinal beams 46, is a track assembly indicated generally at 49, operatively associated with a roller or carriage assembly, indicated generally at 51 (FIGS. 2 and 3). The track assembly 49 is comprised of a pair of track units 52 each of which, as best appears in FIG. 3, is of an irregular shape having a straight side 53 and an oppositely disposed concavely curved track side or surface 54 and with one end 56 having a cutaway portion 57 at the side 54, and the opposite end 58 having a cutaway portion 59 formed at the side 58', with the portions 57 and 59 being of a generally right angle shape. Since each of the track units 52 is of a similar construction, and similarly connected with the box section members 43 and 44 only one of the track units 52 will be described in detail.

Figure 4:
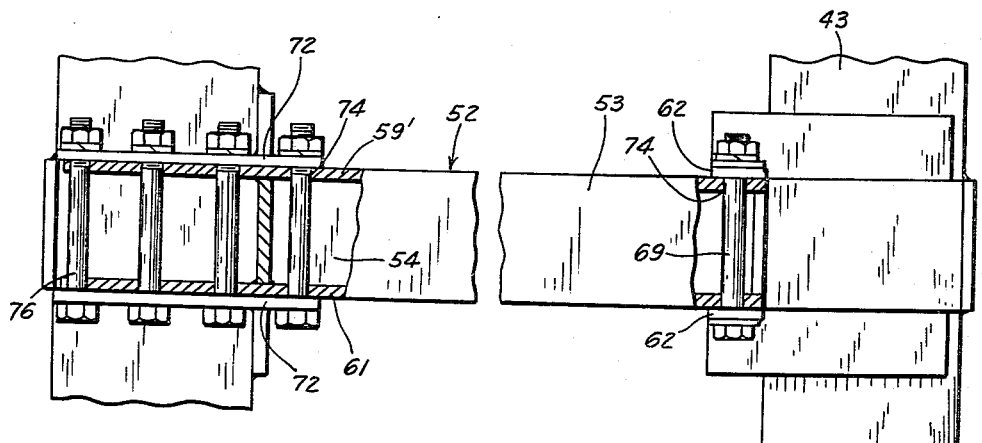
FIG. 4 is an enlarged sectional detail view as seen on the line 4—4 in FIG. 3.

A track unit 52 (FIG. 4) is of a box construction comprised of side plates 59' and 61, a top plate or slide 53 and a bottom plate or track surface 54. The box section 43 (FIGS. 3 and 4) has secured thereto, as by welding or the like, a pair of transversely spaced bracket members 62 of a flat L-shape and of a size to fit in a nested relation with the inner side 63 and lower side 64 of the beam 43, as best shown in FIG. 3. The long leg 66 of the bracket 62 projects upwardly above the top level of the platform 10 into a central opening 67 (FIG. 2) extended longitudinally of the central platform section 31 and formed in the platform cover plate 68. The spacing between the bracket members 62 (FIG. 4) is such as to receive the track unit 52 therebetween, with the side walls of the cutaway portion 59 in contact engagement with the walls 63 and 64 of the box section beam member 43. With the track unit 52 pivotally supported at 69, in the projected portion of the bracket legs 66, it will be seen that a track unit 52 is pivotally swingable from its normal position shown in full lines in FIG. 3, upwardly through the platform opening 67 to its dotted line position, also shown in FIG. 3, for a purpose hereinafter to appear.

When the track unit 52 is in its full line, or normal operating position, the shoulder or projection 71 formed at its end 56 by the cutaway portion 57, is in resting engagement on the top side of the box section member 44, with the shoulder 71 being received between a pair of upright transversely spaced brackets 72 secured to and projected upwardly from the box section member 44. The brackets 62 and 72 are formed with bolt openings 73 which are aligned with openings 74, formed in the track unit 52, for receiving bolts 76. As a result, a track unit 52 is rigidly secured to the box section beam members 43 and 44, and on removal of the bolts 76 is swingable about the pivot 69 to a position providing clear and unobstructed access to the carriage or roller assembly 51, and in turn to the piston and cylinder assembly 12.

As illustrated in FIG. 1 the cylinder and piston assembly 12 includes a pit mounted cylinder 78 and an associated plunger or piston 79, the assembly 12 being of single acting type, wherein fluid supplied under pressure from a suitable source (not shown) into the cylinder 78, extends the piston 79 upwardly, with the return stroke of the piston 79 to a retracted position within the cylinder 78 taking place by the gravity action of the load acting thereon.

Figure 5:
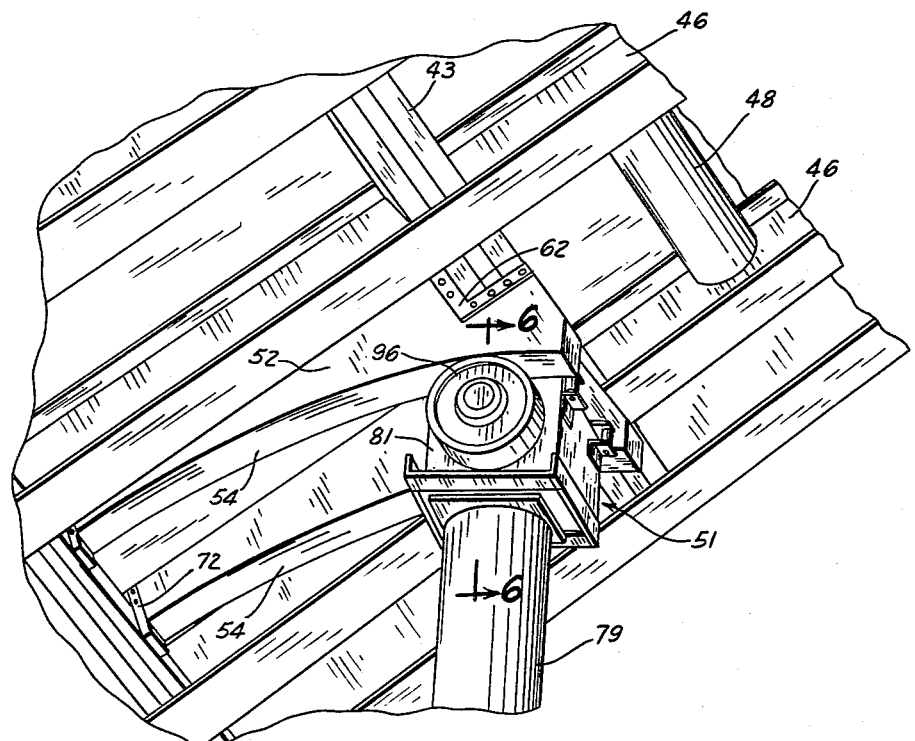
FIG. 5 is an enlarged fragmentary perspective view of the roller and track assembly which forms part of the truck dumping apparatus of this invention.

The piston 79 (FIGS. 5 and 6) supports the carriage or roller assembly 51. This support includes an upright frame structure 81 which forms an upright extension of the piston 79, and comprises essentially a pair of side plate members 82 connected together by a pair of spaced intermediate brace members 83. A pivot shaft 84, extended longitudinally of the platform 10, is held against rotation in bearing guides 86 spaced between the plate members 82 and mounted on the connecting members 83, so that top portions of the shaft 84 are exposed between the bearing guides 86.

The carriage or roller assembly 51 includes an upright frame unit 85 (FIGS. 5 and 6) of a tubular rectangular shape in transverse cross section having a base plate 87 secured to and closing the upper end 88 thereof. Depending from the base plate 87 are a series of bearing members 89 adapted to rest in contact engagement with the exposed portions of the pivot shaft 84 whereby the frame unit 85 is permitted to rock or oscillate about the pivot shaft 84.

Figure 6:
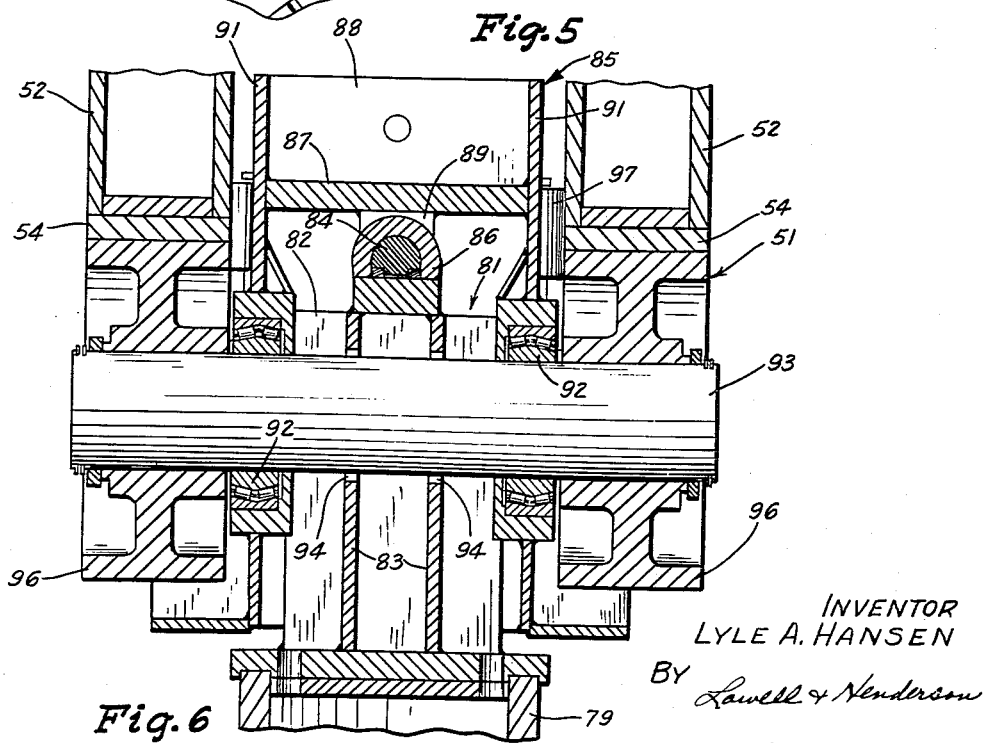
FIG. 6 is an enlarged sectional detail view as seen along the line 6—6 in FIG. 5.

A pair of opposite side members 91 of the frame unit 86 are provided with bearings 92 for rotatably supporting a roller shaft 93. As best shown in FIG. 6 the shaft 93 is loosely extended through openings 94 formed in the frame unit brace members 83 and extends normal to or at right angles to the pivot shaft 84. A roller 96 for engaging a corresponding track surface 54 is mounted at each end of the shaft 93 to the outside of the frame unit 86. Engageable with the inner adjacent sides of the track units 52, at the tracks 54 are pairs of rollers 97 suitably mounted at each corner of the frame unit 81 for rotation about vertical axes.

It is seen, therefore, that the carriage assembly 51 is free to oscillate or swing in a plane extended transversely of the platform 10, in response to any eccentric loadings on the platform and transmitted to the assembly 51 through the track units 52. As a result of such oscillation the piston 79 is not subjected to the effect of the eccentric loading so as to be always freely movable, and without bind, within the cylinder 78.

With the rollers 96 freely rotatable on the shaft 93 a free rolling action is accomplished, with the frictional contact of a roller with the shaft 93 acting to maintain the rollers in a straight following relation with a corresponding track 54. As a result, the guide rollers 97 infrequently contact the track units 52 and are utilized primarily as a safety or precautionary means.

In use, and referring to FIG. 1, the platform 10 is initially in its dotted line position at which time the tractor-trailer combination 19 is driven thereon, and the wheel stops 21 placed in holding position with the rearmost trailer wheels 22. On lifting of the piston 79 the platform 10 is swung upwardly to its full line position, the pivot connection 14 being of a type to permit limited longitudinal movement of the platform 10 relative thereto. The curved contour of the track surfaces 54 is of a predetermined shape relative to the size of the rollers 96 so as to effect to the greatest possible extent what might be termed a straight line contact between a roller and track, as contrasted to a peripheral or pocket engagement of a roller with a track. By virtue of this relative construction the mechanical efficiency of the cylinder assembly 12 is efficiently utilized so that the upward swinging movement of the platform 10 takes place at a substantially uniform rate in response to the application of a constant volume rate of fluid on the lift piston 79.

As a result of the track units 52, on removal of the securing bolts 76, being pivoted at 69 for movement to a position extended upwardly through the platform opening 67 and to a position located to one side of the roller assembly 51, complete access is had to the roller assembly 51 and cylinder and piston assembly 12 for service, maintenance and installation purposes, without requiring handling or blocking of the platform 10. Additionally, it will be appreciated that by virtue of the movable connection between the piston 79 and platform 10, resulting from the pivoted support of the roller assembly 51 on the piston 79, that the piston 79 is substantially free of lateral and torsional stresses effected on the platform 10 by the load being handled. As a result a free moving piston over a long service life is obtained, along with making possible the efficient use of a single cylinder and piston assembly in the lowering and raising of the platform 10.

Although the invention has been described with respect to a preferred embodiment thereof it is to be understood that it is not to be so limited since changes and modifications can be made therein which are within the full intended scope of this invention as defined by the appended claims.

I claim:
1. In a vehicle dumping apparatus, a foundation hav- ing load bearing members disposed substantially at ground level, a vehicle platform supported on said bearing members and pivoted at one end for upward swinging movement of the other end thereof from said bearing members, curved track means extended longitudinally of said platform and exposed from the underside of said platform, means pivotally connecting one end of said track means on said platform, means for detachably securing the other end of said track means to said platform, with the platform having an opening therein above said track means, said track means being located intermediate the ends of said platform, a pit mounted cylinder and piston assembly arranged below said track means for extension upwardly of the piston of said assembly, and roller means on the upper end of said piston engageable with said track means, with extension of said piston acting to swing said platform away from said load bearing portions, with said roller means and assembly, when the platform is supported on said load bearing members, being accessible through said opening on upward pivoted movement of said track means about said one end thereof.

2. In a vehicle dumping apparatus, a foundation having load bearing portions disposed substantially at ground level, a vehicle platform supported on said portions for upward swinging movement of one end thereof, a pair of oppositely arranged parallel track members secured to and extended longitudinally of said platform, said track members having concave roller-bearing surfaces exposed from the underside of said platform, a pit mounted cylinder and piston assembly arranged below said track members for extension of the piston of said assembly in a vertically upward direction, an upright extension on said piston having a pivot means extended longitudinally of said platform, with the vertical axis of the piston and the longitudinal axis of said pivot means having a common plane, a roller carrying shaft extended transversely of said platform, means supporting said shaft from said pivot means, and a pair of rollers on said shaft engageable with corresponding ones of said track members, with extension of said piston acting to swing said platform away from said load bearing portions, said rollers, at any moved position of the piston, having the upper sides thereof in a horizontal plane extended substantially through the longitudinal axis of said pivot means, whereby when an eccentric load is applied on the platform the piston is relieved against tilting movement in a direction transversely of the platform.

3. In a vehicle dumping apparatus, a foundation having load bearing portions disposed substantially at ground level, a vehicle platform supported on said portions for upward swinging movement of one end thereof, track means secured to and extended longitudinally of said platform, said track means having concave roller-bearing surfaces exposed from the under side of said platform, a cylinder and piston assembly arranged below said track means for extension of the piston of said assembly in a substantially vertically upward direction, and an upright extension on said piston having pivot means extended longitudinally of said platform, with the vertical axis of the piston and the longitudinal axis of said pivot means having a common plane, roller means engageable with said track means, means supporting said roller means on said pivot means, said roller means, at any moved position of the piston, having the upper side thereof in a horizontal plane extended substantially through the longitudinal axis of said pivot means, whereby when an eccentric load is applied on the platform the piston is relieved against tilting movement in a direction transversely of the platform.

4. In a vehicle dumping apparatus, load bearing means, a vehicle platform supported on said bearing means for upward swinging movement of one end thereof, track means secured to and extended longitudinally of said platform, said track means having at least one concave roller bearing surface exposed from the underside of said platform, a cylinder and piston assembly arranged below said track means for extension of the piston means of said assembly in a substantially vertically upward direction, pivot means at the upper end of said piston means extended longitudinally of said platform, with the vertical axis of the piston means and the longitudinal axis of said pivot means lying in a substantially common plane, roller means engageable with the concave roller bearing surface of said track means, means supporting said roller means on said pivot means, said roller means at any moved position of the piston, having the upper surface thereof in a horizontal plane extended substantially through the longitudinal axis of said pivot means, whereby when an eccentric load is applied on the platform the piston is relieved against tilting movement in a direction transversely of the platform.

5. In a vehicle dumping apparatus, load bearing means, a vehicle platform supported on said bearing means for upward swinging movement of one end thereof, track means secured to and extended longitudinally of said platform so as to be exposed from the underside of said platform, a piston means and cylinder assembly arranged below said track means for extension of the piston means of said assembly in a substantially vertically upward direction, a roller assembly having roller means engageable with said track means, and pivot means operatively connected to the upper end of said piston means and said roller assembly, the longitudinal axis of the pivot means being disposed substantially in the plane of the vertical axis of the piston means, said roller means having the upper surface thereof extending in a horizontal plane in proximity to the longitudinal axis of the pivot means whereby the roller assembly may be pivoted on the piston means for transverse rocking movement about the longitudinal axis of the pivot means.

References Cited in the file of this patent
UNITED STATES PATENTS

| | | |
|---|---|---|
| 1,338,798 | Swanson | May 4, 1920 |
| 2,578,849 | Small | Dec. 18, 1951 |
| 2,793,767 | Smith et al. | May 28, 1957 |
| 2,953,410 | Chaney | Sept. 20, 1960 |

FOREIGN PATENTS

| | | |
|---|---|---|
| 543,084 | France | May 26, 1922 |
| 360,970 | Germany | Oct. 9, 1922 |